(12) United States Patent
Rockstroh

(10) Patent No.: US 10,919,106 B2
(45) Date of Patent: Feb. 16, 2021

(54) ULTRASONIC WELDING OF ANNULAR COMPONENTS

(71) Applicant: General Electric Company, Schenectady, NY (US)

(72) Inventor: Todd Jay Rockstroh, Maineville, OH (US)

(73) Assignee: General Electric Company, Schenectady, NY (US)

( * ) Notice: Subject to any disclaimer, the term of this patent is extended or adjusted under 35 U.S.C. 154(b) by 416 days.

(21) Appl. No.: 15/618,282

(22) Filed: Jun. 9, 2017

(65) Prior Publication Data
US 2018/0354063 A1    Dec. 13, 2018

(51) Int. Cl.
| | | |
|---|---|---|
| *B23K 20/10* | (2006.01) | |
| *B23K 20/16* | (2006.01) | |
| *B21C 37/09* | (2006.01) | |
| *B21C 37/12* | (2006.01) | |
| *B21C 37/15* | (2006.01) | |
| *B23K 101/00* | (2006.01) | |

(52) U.S. Cl.
CPC ............ *B23K 20/103* (2013.01); *B21C 37/09* (2013.01); *B21C 37/122* (2013.01); *B21C 37/123* (2013.01); *B21C 37/154* (2013.01); *B23K 20/16* (2013.01); *B23K 2101/001* (2018.08)

(58) Field of Classification Search
CPC .... B23K 20/10; B23K 20/103; B23K 13/046; F01D 25/26; B21C 37/154
USPC ............ 228/126, 153, 173.4, 181, 129, 130, 228/173.7, 143, 150
See application file for complete search history.

(56) References Cited

U.S. PATENT DOCUMENTS

| | | | | |
|---|---|---|---|---|
| 1,363,160 A | * | 12/1920 | Murray, Jr. ........... | B21C 37/154 219/67 |
| 1,930,285 A | * | 10/1933 | Robinson .................. | B64C 3/00 138/143 |
| 2,072,273 A | * | 3/1937 | Obert ...................... | B23K 5/006 138/151 |
| 2,104,884 A | * | 1/1938 | Quarnstrom ............ | B21C 37/09 138/142 |
| 2,234,450 A | * | 3/1941 | Quarnstrom ............ | B21C 37/09 228/148 |
| 2,433,966 A | * | 1/1948 | Keuren ................. | B21C 37/124 219/62 |

(Continued)

FOREIGN PATENT DOCUMENTS

| | | |
|---|---|---|
| CN | 2470042 Y | 1/2002 |
| CN | 1907643 A | 2/2007 |

(Continued)

OTHER PUBLICATIONS

English Translation of Chinese Office Action for application 201810589500.1 dated May 6, 2020 (16 pages).

(Continued)

*Primary Examiner* — Erin B Saad
*Assistant Examiner* — Carlos J Gamino
(74) *Attorney, Agent, or Firm* — Dinsmore & Shohl LLP

(57) ABSTRACT

A method of making an annular component includes forming sheet feedstock into an annular shape disposed about a central axis; and bonding one portion of the feedstock to another portion of the feedstock using ultrasonic welding, so as to fix the annular shape.

13 Claims, 6 Drawing Sheets

(56) References Cited

U.S. PATENT DOCUMENTS

| | | | | |
|---|---|---|---|---|
| 2,539,237 A * | 1/1951 | Dreyer | B21D 15/06 | 219/67 |
| 2,767,740 A * | 10/1956 | Fentress | B21C 37/205 | 138/121 |
| 3,042,365 A * | 7/1962 | Curtis | F01D 11/125 | 415/173.4 |
| 3,062,507 A * | 11/1962 | Andrus | B01J 3/048 | 165/185 |
| 3,123,905 A | 3/1964 | Thomas | | |
| 3,163,183 A * | 12/1964 | Sagara | F16L 9/04 | 138/144 |
| 3,319,929 A * | 5/1967 | Lawrence | F01D 5/10 | 415/119 |
| 3,357,089 A * | 12/1967 | Larsen | B21D 51/24 | 228/151 |
| 3,425,380 A * | 2/1969 | Krainer | B21D 51/24 | 220/586 |
| 3,478,784 A * | 11/1969 | Woelfer | B21D 51/24 | 138/157 |
| 3,528,162 A * | 9/1970 | Sagara | B01J 3/048 | 228/129 |
| 3,608,171 A * | 9/1971 | Stradtmann | F02M 61/168 | 29/890.129 |
| 3,610,290 A * | 10/1971 | Anderson | B23K 20/22 | 138/143 |
| 3,647,130 A | 3/1972 | Hahne | | |
| 3,704,509 A * | 12/1972 | Yamauchi | B23K 9/23 | 228/184 |
| 3,755,883 A * | 9/1973 | Shimizu | B21D 51/24 | 228/143 |
| 3,851,376 A * | 12/1974 | Gross | B21C 37/126 | 228/145 |
| 3,870,218 A * | 3/1975 | Ehle | B23K 37/04 | 228/4.1 |
| 4,142,284 A * | 3/1979 | Steuber | B21C 37/12 | 29/417 |
| 4,244,482 A * | 1/1981 | Baumgart | F16J 12/00 | 138/142 |
| 4,295,592 A * | 10/1981 | Schafer | C07C 275/50 | 228/17 |
| 4,413,657 A * | 11/1983 | Sasaki | B21C 37/154 | 138/111 |
| 4,433,845 A * | 2/1984 | Shiembob | F01D 11/125 | 277/414 |
| 4,477,089 A * | 10/1984 | Hoffman | F01D 11/02 | 228/181 |
| 4,509,447 A * | 4/1985 | Smith, Sr. | F16L 9/16 | 114/65 R |
| 4,585,156 A * | 4/1986 | Raley | B23P 15/16 | 228/132 |
| 4,600,619 A * | 7/1986 | Chee | B29C 53/824 | 428/118 |
| 5,297,410 A * | 3/1994 | Goff | B21C 37/06 | 72/47 |
| 5,532,451 A | 1/1996 | La Rocca | | |
| 5,569,508 A * | 10/1996 | Cundiff | B29C 44/186 | 428/117 |
| 5,579,809 A * | 12/1996 | Millward | F16L 9/121 | 138/129 |
| 5,840,154 A * | 11/1998 | Wittmaier | B23K 20/103 | 156/580.2 |
| 5,895,699 A * | 4/1999 | Corbett | B32B 3/12 | 428/116 |
| 5,899,037 A * | 5/1999 | Josey | E04B 2/58 | 428/118 |
| 5,958,602 A * | 9/1999 | Usui | B21C 37/06 | 428/592 |
| 6,116,290 A * | 9/2000 | Ohrn | F16L 59/143 | 138/149 |
| 6,227,252 B1 * | 5/2001 | Logan | F16L 9/04 | 138/115 |
| 6,251,494 B1 * | 6/2001 | Schreiber | F01D 11/127 | 228/181 |
| 6,266,862 B1 * | 7/2001 | Oostwouder | B23K 31/02 | 29/281.4 |
| 6,315,520 B1 * | 11/2001 | Haje | B22C 9/10 | 415/178 |
| 6,336,803 B1 * | 1/2002 | Funger | B01J 19/10 | 156/580.2 |
| 6,347,453 B1 * | 2/2002 | Mitchell | B21C 37/154 | 29/506 |
| 6,457,629 B1 * | 10/2002 | White | B23K 20/10 | 228/112.1 |
| 6,630,093 B1 * | 10/2003 | Jones | B29C 70/088 | 264/401 |
| 6,650,215 B1 * | 11/2003 | Gundale | B23K 20/103 | 336/61 |
| 6,814,823 B1 * | 11/2004 | White | B23K 11/0013 | 156/73.1 |
| 6,936,212 B1 * | 8/2005 | Crawford | B28B 1/00 | 264/308 |
| 6,949,282 B2 * | 9/2005 | Obeshaw | B21C 37/15 | 138/119 |
| 7,503,164 B2 * | 3/2009 | McMillan | F01D 21/045 | 181/213 |
| 7,866,196 B2 * | 1/2011 | Vanderbeken | B21C 37/122 | 72/50 |
| 8,210,420 B1 * | 7/2012 | Blue | B23K 20/103 | 228/110.1 |
| 8,828,513 B2 * | 9/2014 | Tiwari | B32B 15/14 | 428/36.1 |
| 8,931,323 B2 * | 1/2015 | Kaminsky | B21C 37/09 | 72/363 |
| 9,333,705 B1 | 5/2016 | Fujita et al. | | |
| 2002/0092891 A1 * | 7/2002 | Pascal | B21C 37/09 | 228/173.6 |
| 2005/0034820 A1 * | 2/2005 | Schneider | B29C 66/92431 | 156/580.1 |
| 2007/0295440 A1 * | 12/2007 | Stucker | B23K 20/10 | 156/73.1 |
| 2011/0143161 A1 * | 6/2011 | Schroth | B23K 20/103 | 428/594 |
| 2012/0273556 A1 * | 11/2012 | Unan | B21C 37/122 | 228/154 |
| 2013/0195605 A1 * | 8/2013 | Robertson | F01D 11/125 | 415/1 |
| 2013/0195635 A1 * | 8/2013 | Robertson, Jr. | F01D 11/122 | 415/197 |
| 2015/0147156 A1 * | 5/2015 | Care | F01D 21/045 | 415/9 |
| 2015/0308290 A1 * | 10/2015 | Kappes | F01D 25/24 | 415/119 |
| 2015/0345326 A1 * | 12/2015 | Robertson, Jr. | F01D 25/005 | 415/9 |
| 2016/0032833 A1 * | 2/2016 | Robertson, Jr. | F01D 11/125 | 415/119 |
| 2016/0193688 A1 * | 7/2016 | Kironn | B23K 26/40 | 219/76.12 |
| 2016/0305271 A1 * | 10/2016 | Schmidt | F01D 5/147 | |
| 2016/0311051 A1 * | 10/2016 | Nordman | B23K 20/103 | |
| 2017/0297241 A1 * | 10/2017 | Magnaudeix | B29C 70/48 | |
| 2019/0056182 A1 * | 2/2019 | Bischel | B21C 37/154 | |

FOREIGN PATENT DOCUMENTS

| | | | | |
|---|---|---|---|---|
| CN | 103386335 A | | 11/2013 | |
| CN | 103962714 A | | 8/2014 | |
| FR | 1302822 A | * | 8/1962 | F16L 9/04 |
| FR | 2480652 | | 10/1981 | |
| GB | 519550 A | * | 3/1940 | B21C 37/154 |
| GB | 1355462 | | 6/1974 | |
| JP | H02142686 A | | 5/1990 | |

(56) References Cited

FOREIGN PATENT DOCUMENTS

| | | |
|---|---|---|
| JP | H06170558 A | 6/1994 |
| WO | 2015134326 | 9/2015 |

OTHER PUBLICATIONS

English Translation of Chinese office action for application 201810589500.1 dated Oct. 19, 2020 (17 pages).

* cited by examiner

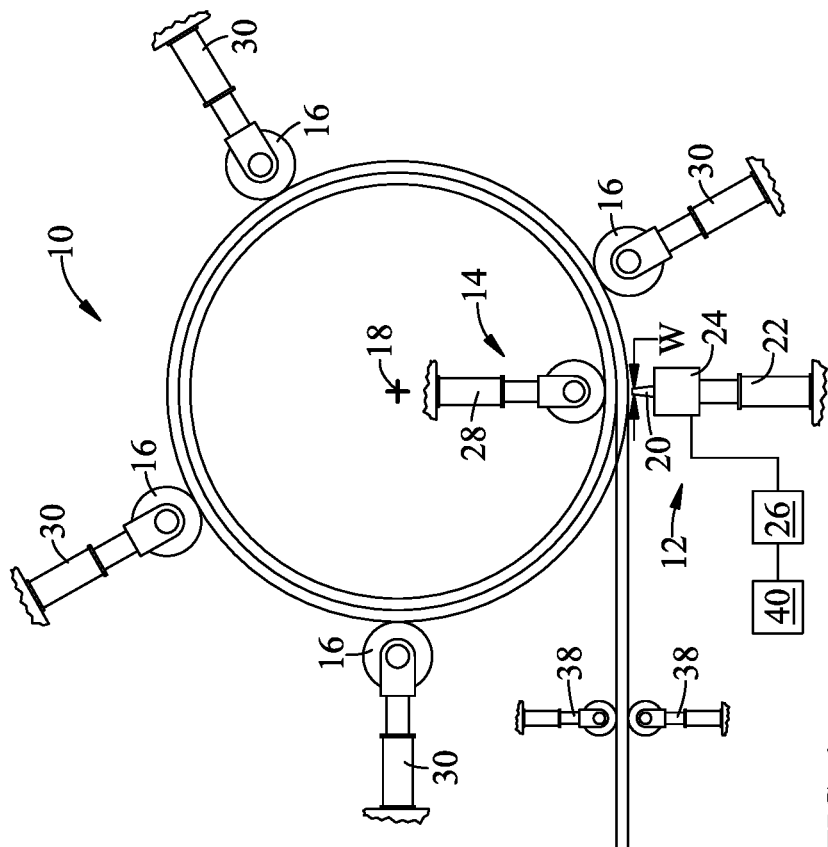
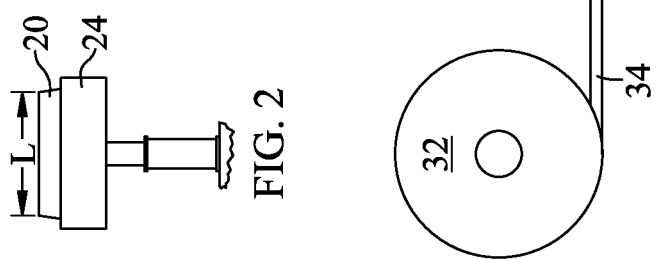
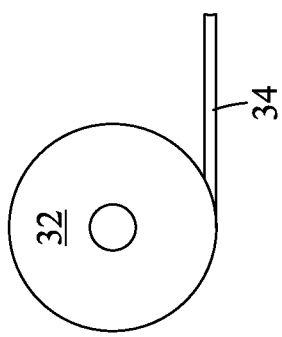

ULTRASONIC WELDING OF ANNULAR COMPONENTS

BACKGROUND OF THE INVENTION

This invention relates generally to component manufacturing, and more particularly to apparatus and methods for manufacturing large shell-type structures.

Numerous products incorporate structures or components which have an annular shape in the form of a cylinder, cone, or partial cylinder. An example would be a cylindrical casing for a gas turbine engine.

Especially in the case of large-scale annular components, it can be difficult to manufacture these components in an economical manner, as they must be cast or forged to have adequate material properties. If they are built up from sub-components, conventional joining processes such as fusion welding can lower the material properties undesirably.

One alternative joining process is ultrasonic welding. This process uses an "ultrasonic horn" which is a thin blade or rib tool powered by a piezoelectric transducer and actuated at its resonant frequency to put ultrasonic energy into the workpiece. This does generate heat but it is not fusion welding; rather it is a solid-state bond.

One problem with existing ultrasonic welding processes is that they are not capable of forming curved or annular components.

BRIEF DESCRIPTION OF THE INVENTION

This problem is addressed by a method of using an ultrasonic welding process combined with a rolling or bending process to form annular structures.

According to one aspect of the technology described herein, a method of making an annular component includes: forming sheet feedstock into an annular shape disposed about a central axis; and bonding one portion of the feedstock to another portion of the feedstock using ultrasonic welding, so as to fix the annular shape.

According to another aspect of the technology described herein, a method of making an annular turbine engine component includes: forming sheet metal feedstock into an annular shape; bonding one portion of feedstock to another portion of the feedstock using ultrasonic welding; repeating the steps of forming and bonding the feedstock to create a plurality of concentric layers; and forming bonds between the layers using ultrasonic welding.

BRIEF DESCRIPTION OF THE DRAWINGS

The invention may be best understood by reference to the following description taken in conjunction with the accompanying drawing figures in which:

FIG. 1 is a schematic, end view of an exemplary ultrasonic welding apparatus;

FIG. 2 is a schematic side view of an ultrasonic welding head of the apparatus shown in FIG. 1;

DETAILED DESCRIPTION OF THE INVENTION

Figure 3:
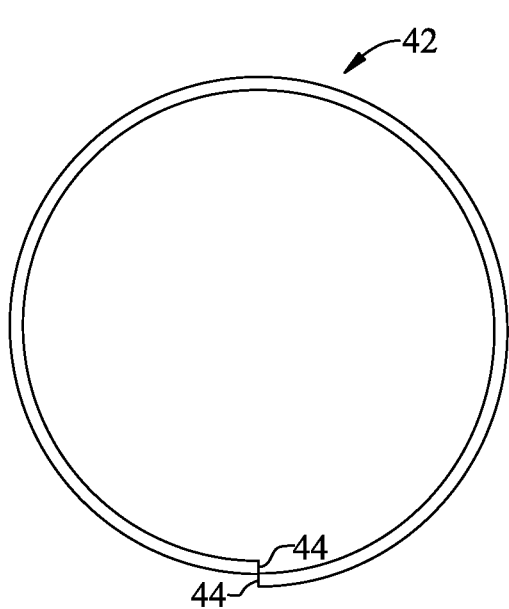
FIG. 3 is a schematic end view showing a first step of a component forming process using the apparatus of FIG. 1.

Referring to the drawings wherein identical reference numerals denote the same elements throughout the various views, FIG. 1 illustrates schematically a welding and forming apparatus 10 suitable for carrying out a combined ultrasonic welding and forming operation. Basic components of the apparatus 10 include an ultrasonic welding head 12, a workpiece support 14, and a plurality of forming elements 16, all arrayed about a central axis 18. Each of these components will be described in more detail below.

The ultrasonic welding head 12 comprises a probe or "ultrasonic horn" 20 which is configured, in accordance with known techniques, to be actuated at its resonant frequency to transfer ultrasonic energy into a workpiece that the probe 20 is contacting, resulting in workpiece heating and creation of a solid-state bond. In the example shown in FIGS. 1 and 2, the probe 20 has a small width "W", for example about 1 mm (0.04 inches), and an overall length "L" as required to suit a particular application, for example several centimeters (inches). The length (i.e. longest dimension) of the probe 20 is oriented parallel to the central axis 18 of the apparatus 10 and appropriate actuator or adjustment device 22 may be provided to move the ultrasonic welding head 12 in the radial direction relative to the central axis 18 (i.e. towards or away from the workpiece).

The probe 20 is mechanically coupled to a driver 24 (shown schematically) configured to vibrate the probe 20 at one of its resonant frequencies. One example of a known type of driver is a piezoelectric transducer. The driver 24 may be coupled to an appropriate electrical power supply 26.

The workpiece support 14 includes a surface positioned facing the probe 20 and configured to be pressed against a workpiece in opposition to the probe 20, in order to provide support and prevent deflection of the workpiece. In the illustrated example, the workpiece support 14 comprises a cylindrical roller. An appropriate actuator or adjustment device 28 may be provided to move the backside pressure device in the radial direction and/or adjust the pressure applied to the workpiece.

The forming elements 16 include one or more surfaces positioned and configured to apply pressure to a workpiece causing it to form in a curved shape as it is fed into the apparatus 10. In the illustrated example, the forming elements 16 include a plurality of cylindrical rollers arrayed in appropriate locations around the central axis 18. An appropriate actuator or adjustment device 30 may be provided to move the forming elements 16 in the radial direction and/or adjust the pressure applied to the workpiece. Additional actuators or mechanical elements (not shown) may be provided to move the forming elements 16 through one or more forming motions (sliding, moving in an arc, etc.) in accordance with conventional practice for sheet metal bending processes.

One or more supply rolls 32 are provided in proximity to the apparatus 10. Each supply roll 32 contains a supply of feedstock 34, in the form of sheet material wound about a central mandrel.

The feedstock 34 may be any material which capable of being bonded using ultrasonic welding and which is also capable of being formed into a curved or annular shape without fracturing (e.g. a material which is ductile rather than brittle). An example of a suitable feedstock material is a metal alloy in sheet form. The thickness of the feedstock is limited by the depth of penetration of the ultrasonic welding process. As one example, the metal alloy sheet may be about 0.5 mm (0.010 inches) thick or less.

Optionally, the apparatus 10 may include a feed mechanism configured to pull material from the supply rolls 32 and feed it into the apparatus 10. In the illustrated example, the feed mechanism comprises a pair of opposed feed rollers 38 which engage in clamp the feedstock 34 from opposite faces. The feed rollers 38 may be driven, for example, by one or more electric motors (not shown).

The operation of the apparatus 10 described above including the welding head 12, workpiece support 14, forming elements 16, and feeding mechanism may be controlled, for example, by software running on one or more processors embodied in one or more devices such as a programmable logic controller ("PLC") or a microcomputer (shown schematically at 40). Such processors may be coupled to various sensors and operating components, for example, through wired or wireless connections. The same processor or processors may be used to retrieve and analyze sensor data, for statistical analysis, and for feedback control.

A method of using the apparatus 10 described above to form an annular component will now be described with reference to FIGS. 1, 3, and 4.

Initially, feedstock 34 in sheet form is fed from the supply rolls 32 into the apparatus 10. In the illustrated example, the feedstock 34 is driven into the apparatus 10 by the powered feed rollers 38.

As the feedstock 34 enters the apparatus 10, contact with the forming elements 16 deflects the feedstock 34, causing it to bend and form into a curve. The feeding and bending process continues until the feedstock 34 forms a complete 360° annulus, defining a generally annular shape. The annular shape may be cylindrical or it may be tapered, resulting in a conical or frustoconical shape.

Figure 4:
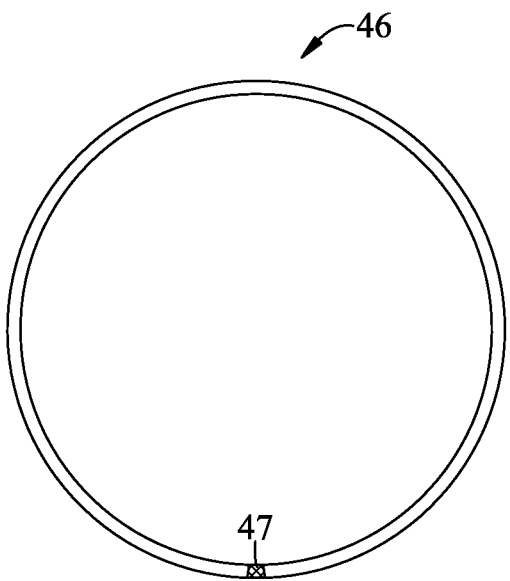
FIG. 4 is a schematic end view showing a second step of the component forming process shown in FIG. 3.

Once the complete annulus is formed, the feedstock 34 may be cut off by conventional means such as a metal shear (not shown), leaving an annular workpiece 42 formed with free ends 44 (FIG. 3).

The welding head 12 is then used to join the free ends 44 by ultrasonically welding them together, thereby fixing the annular shape. This step may be carried out while the workpiece 42 is still in the apparatus 10, surrounded by the forming elements 16. The joint may be, for example a butt joint or a lap joint. If a lap joint is used, a machining process may be used to remove excess material thickness. The result is a single-layer annular component 46 (FIG. 4). An exemplary ultrasonic weld joint is shown at 47.

Figure 5:
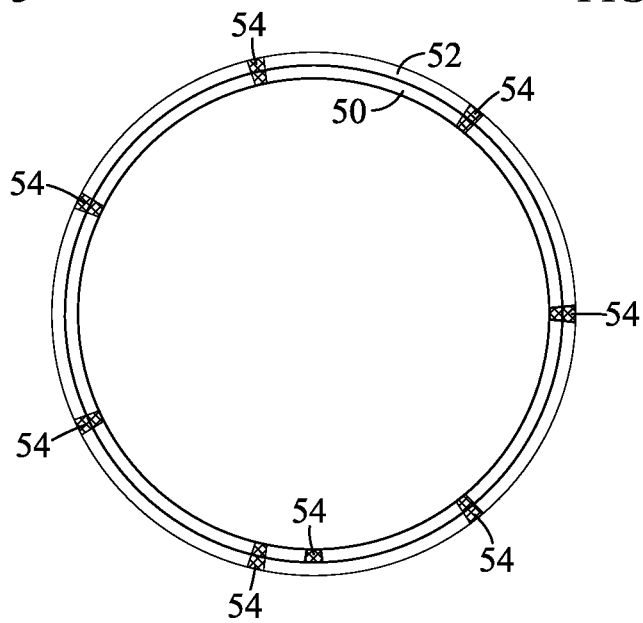
FIG. 5 is a schematic end view showing a third step of the component forming process shown in FIG. 3.

The process may be repeated to create another layer on top of (e.g. radially outside of) the annular component 46, resulting in a multi-layer annular component, seen in FIG. 5 with exemplary layers 50, 52. Ultrasonic welding may be used to join the first layer 50 to the second layer 52 at intervals around the component's periphery. Exemplary ultrasonic weld joints are shown at 54. This process may be repeated as many times as necessary, with each new layer being bonded to the previous layer by an ultrasonically-welded joint to build up a desired material thickness, resulting in a finished multi-layer component.

Figure 6:
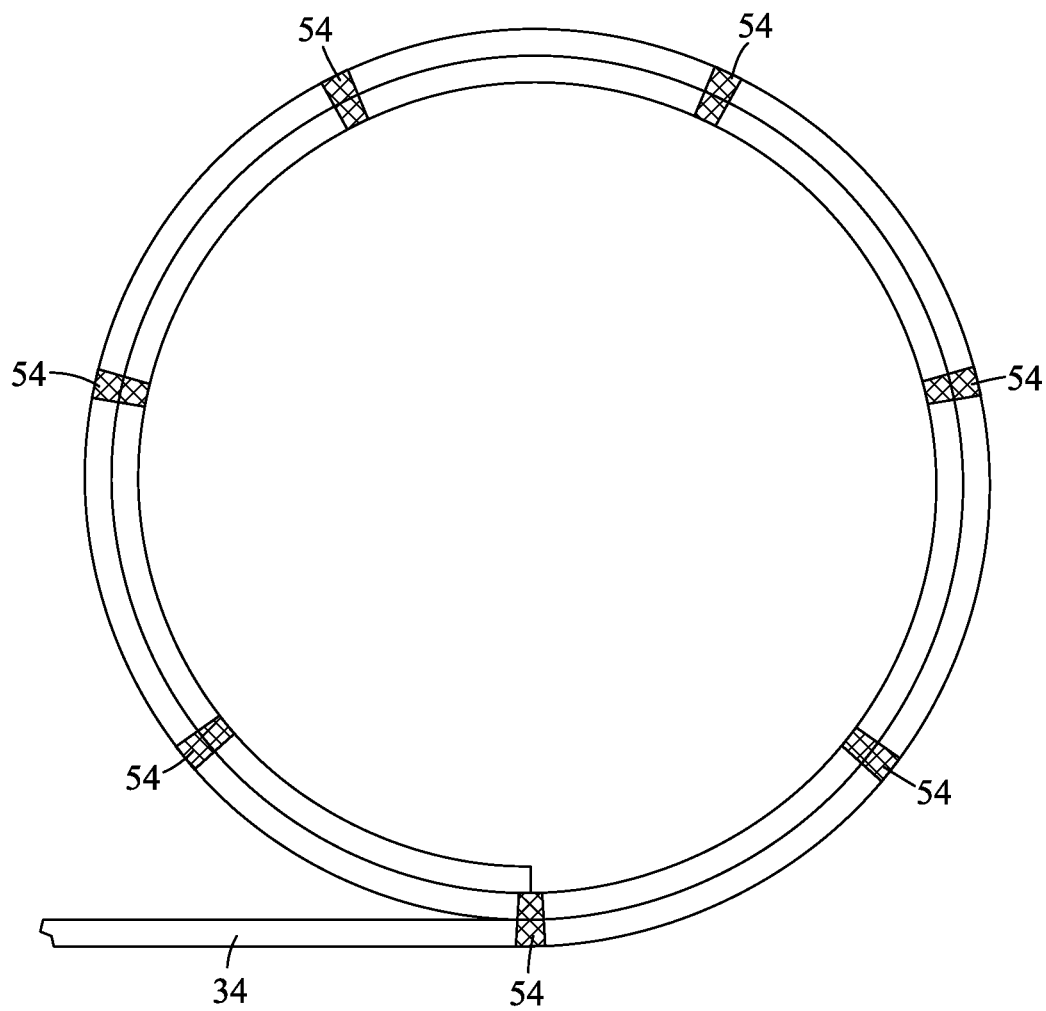
FIG. 6 is a schematic end view showing an alternative component forming process using the apparatus of FIG. 1.

Alternatively, the layers may be built up in a continuous process. More specifically, the feedstock 34 may be fed in continuously and built up in a spiral shape, using the welding head 12 to join the layers together at selected intervals. This process is illustrated in FIG. 6; exemplary weld joints are shown at 54.

Once the build-up of layers is complete, the annular component is then ready for additional processes such as finish machining, coating, inspection, etc.

The basic method described above permits multiple variations to produce diverse types of annular structures.

Figure 8:
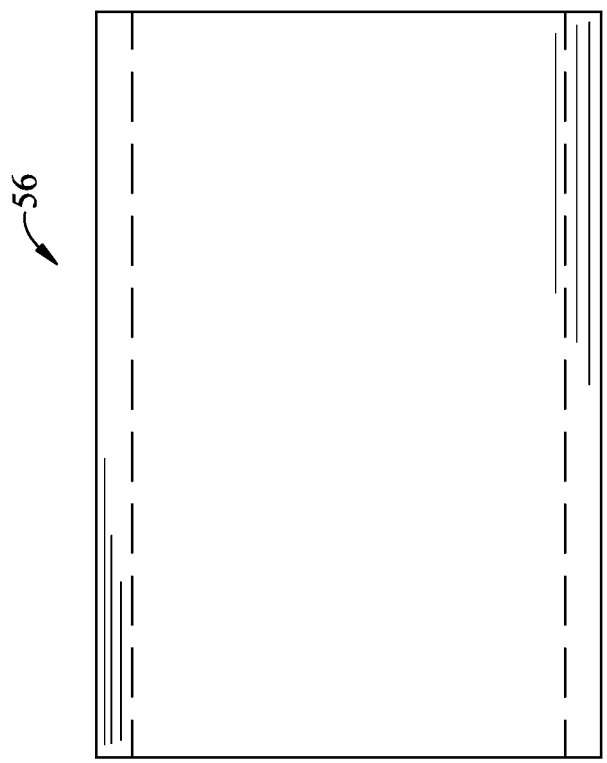
FIG. 8 is a side elevation view of the structure shown in FIG. 7.
Figure 7:
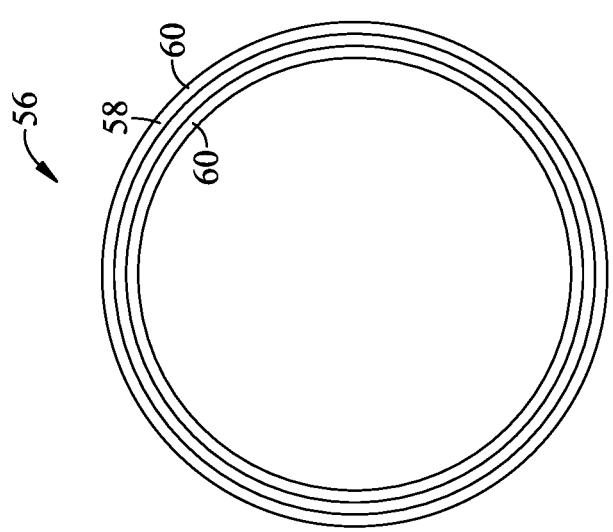
FIG. 7 is a schematic end view of an exemplary multi-layer structure manufactured using the apparatus of FIG. 1.

One option is to produce vary the structure by using different materials in different layers. For example, FIGS. 7 and 8 illustrate a generally cylindrical annular component 56 produced by the method described above and comprising a plurality of layers. Several of the layers, labeled 58 comprise a first metal alloy, and others of the layers, labeled 60 comprise a second metal alloy. Any combination of alloys is possible, for example every layer could be a unique alloy. Various combinations and alloys may be used to produce a component having desirable composite properties. For example, a component could include layers made of high-strength alloys such as nickel alloys, alternated with layers having high thermal conductivity, such as copper alloys.

It is also possible for one or more of the layers of the multi-layer annular component to be discontinuous rather than continuous. For example, the layers may include openings such as, holes, slots, or grooves. Alternatively, individual layers may be formed as a series of spaced-apart ribs in order to define internal structures and hollow spaces.

A combination of continuous and discontinuous layers, or layers of different dimensions, may be used to form structures such as flanges, ribs, etc., or to form voids or hollow spaces. For example, one or more layers may be in the form of bands or strips having a different width than the other layers.

Figure 10:
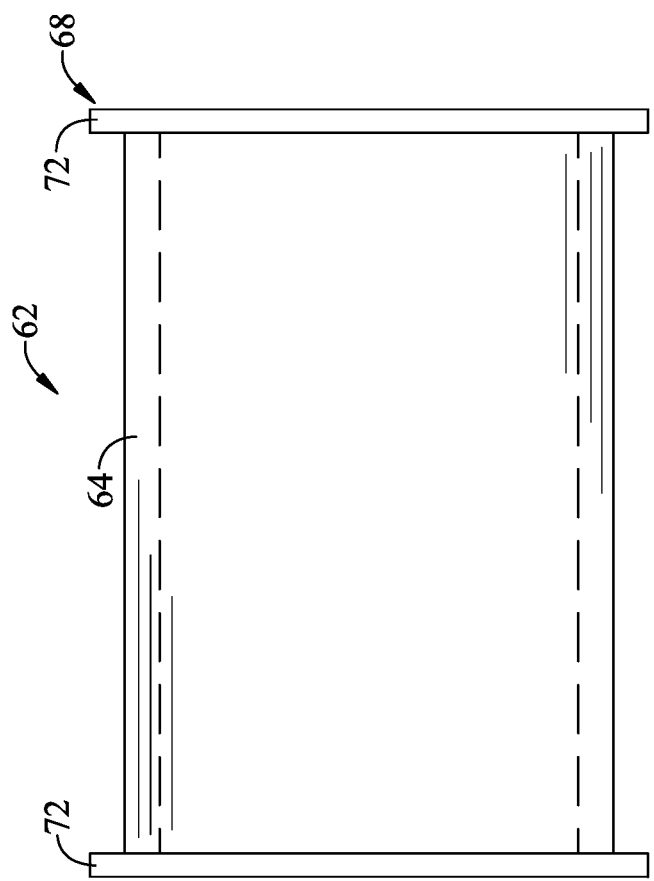
FIG. 10 is a side elevation view of the structure shown in FIG. 9.
Figure 9:
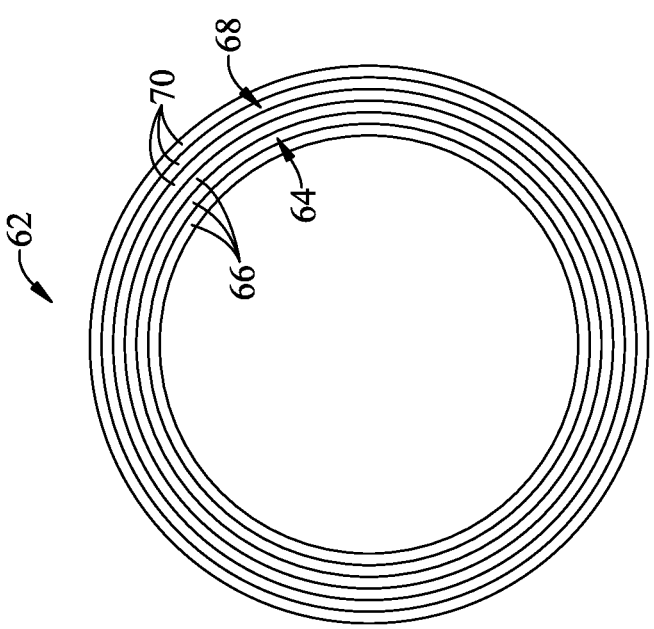
FIG. 9 is a schematic end view of another exemplary multi-layer structure manufactured using the apparatus of FIG. 1.

For example, FIGS. 9 and 10 illustrate an annular multi-layer component 62 comprising an inner portion or body 64 formed of one or more layers 66 which are continuous defining a cylinder, and an outer portion 68 formed of one or more continuous layers 70 each having a width (i.e. dimension measured parallel to axis 18) less than the layers 66. These layers 70 extend out radially to form flanges 72. A similar process may be used to selectively form thicker portions to be later machined into bosses, flanges, etc.

Figure 11:
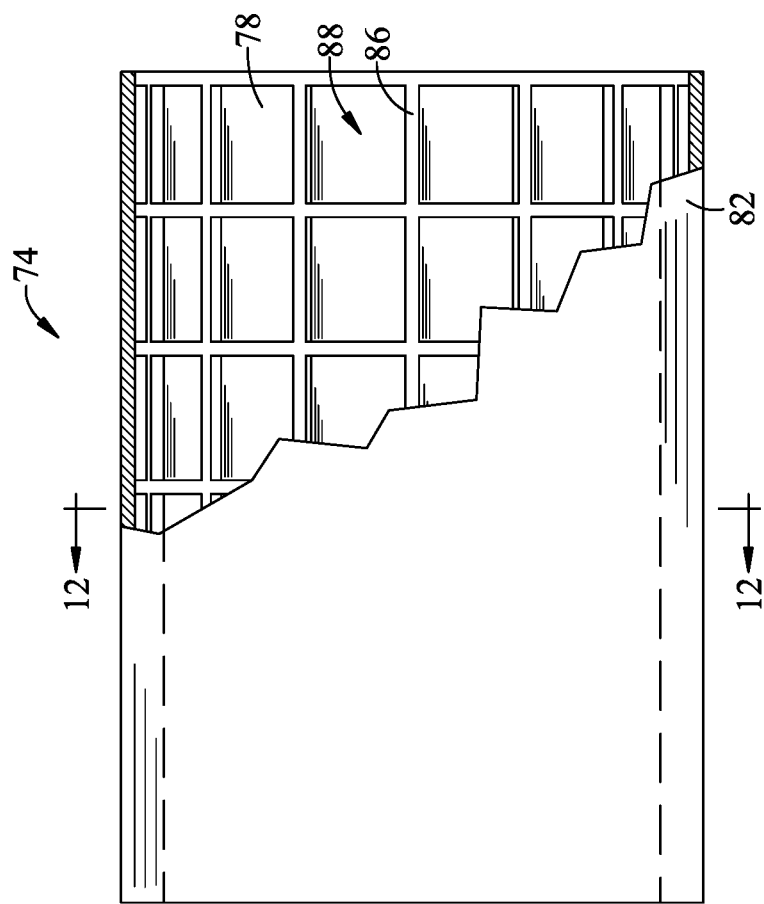
FIG. 11 is a schematic, partially-broken-away side elevation view of another exemplary multi-layer structure manufactured using the apparatus of FIG. 1.
Figure 12:
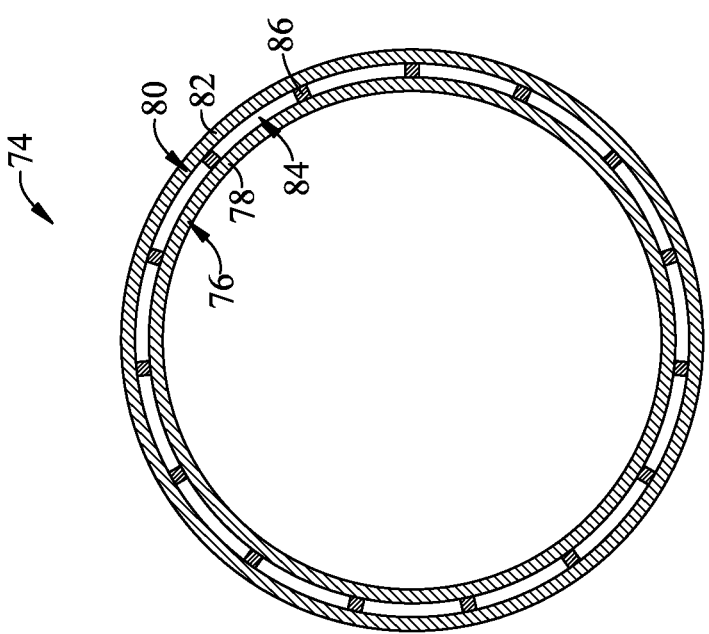
FIG. 12 is a view taken along lines 12-12 of FIG. 11.

As another example, FIGS. 11 and 12 illustrate an annular multi-layer structure 74 comprising an inner wall 76 formed of one or more layers 78 which are continuous, radially spaced-away from an outer wall 80 formed of one or more layers 82 which are continuous, and an interior structure 84 formed of one or more layers which are discontinuous and which include solid portions 86 defining internal open voids or hollow spaces 88. Alternatively, the interior structure 84 could comprise spaced-apart continuous layers which are narrower than the inner and outer walls 76, 80 (e.g. ribs or bands).

If a layer of a multi-layer structure includes voids, those voids may be filled using any material that can withstand the elevated temperatures of the ultrasonic welding process. For example, any opening in a metallic layer could be filled with a nonmetallic material. Nonlimiting examples of suitable nonmetallic materials having elevated temperature capability include polyetherimide resin (e.g. ULTEM) or aramid The method described herein has several advantages over the prior art. In particular, it reduces raw material costs and tooling costs for large annular structures, compared to forgings. The use of solid-state bonding avoids material property debits normally associated with welding processes, enabling a structure closer to or equivalent to forged structure. It offers the opportunity for performance improvements in annular structures by mixing/layering alternative layers of materials. It also permits alternating structural material layers with lighter weight layers for reduced specific fuel consumption ("SFC").

The foregoing has described an apparatus and method for forming large structural components using an ultrasonic welding process. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of making an annular component, comprising:
    forming sheet feedstock into an annular shape disposed about acentral axis;
    bonding one portion of the sheet feedstock to another portion of the sheet feedstock using ultrasonic welding, so as to fix the annular shape;
    repeating the steps of forming and bonding sheet feedstock to create a plurality of concentric layers; and
    forming bonds between the plurality of concentric layers using ultrasonic welding,
    wherein the plurality of concentric layers includes a first group of layers which are continuous, and a second group of layers which are discontinuous having solid portions defining internal open voids, so as to define at least one raised feature on an inner or outer surface of the annular component.

2. The method of claim 1 further comprising machining the component to define one or more features.

3. The method of claim 1 wherein a first of the plurality of concentric layers comprises a first metal alloy, and wherein a second of plurality of concentric layers comprises a second metal alloy different from the first metal alloy.

4. A method of making an annular component, comprising:
    forming sheet feedstock into an annular shape disposed about a central axis;
    bonding one portion of the sheet feedstock to another portion of the sheet feedstock using ultrasonic welding, so as to fix the annular shape;
    repeating the steps of forming and bonding sheet feedstock to create a plurality of concentric layers; and
    forming bonds between the plurality of concentric layers using ultrasonic welding,
    wherein the plurality of concentric layers includes a first group of layers which are continuous, a second group of layers of the plurality of concentric layers which define open spaces therebetween, and a third group of layers of the plurality of concentric layers which are continuous, so as to define at least one interior space which is bounded by the first, second, and third groups of layers,
    wherein the second group of layers is positioned between the first group of layers and the third group of layers.

5. The method of claim 4 further comprising disposing a nonmetallic filler into the interior space.

6. The method of claim 1 wherein the annular shape formed during the forming step has free ends, and ultrasonic welding is used to bond the free ends together, forming a butt joint or a lap joint therebetween.

7. The method of claim 1 wherein the forming step is performed by feeding the sheet feedstock against one or more forming elements, the one or more forming elements being positioned about the central axis.

8. The method of claim 7 wherein the forming elements include a plurality of rollers.

9. The method of claim 7 wherein the ultrasonic welding is carried out while the feedstock is surrounded by the forming elements.

10. The method of claim 1 wherein the annular component has a generally cylindrical shape.

11. A method of making an annular turbine engine component, comprising:
    feeding sheet metal feedstock into a forming apparatus having at least one forming element;
    forming sheet metal feedstock into an annular shape using the at least one forming element to deflect the sheet metal feedstock, causing it to bend and form into a curve;
    bonding one portion of the sheet metal feedstock to another portion of the sheet metal feedstock using ultrasonic welding;
    repeating the steps of forming and bonding sheet metal feedstock to create a plurality of concentric layers; and
    forming bonds between the plurality of concentric layers using ultrasonic welding,
    wherein the plurality of concentric layers includes a first group of layers which are continuous, and a second group of layers which are discontinuous having solid portions defining internal open voids, so as to define at least one raised feature on an inner or outer surface of the annular component,
    wherein the forming bonds between the plurality of concentric layers is performed at intervals around the annular shape.

12. The method of claim 11 wherein a first of the plurality of concentric layers comprises a first metal alloy, and a second of the plurality of concentric layers comprises a second metal alloy different from the first metal alloy.

13. The method of claim 11:
    wherein the second group of layers define open spaces therebetween, the method further comprising:
    forming the sheet metal feedstock into a third group of layers which are continuous, so as to define at least one interior space bounded by the first, second, and third groups of layers.

* * * * *